US008593742B2

(12) United States Patent
Takahashi (10) Patent No.: US 8,593,742 B2
(45) Date of Patent: Nov. 26, 2013

(54) SCREW-MOUNT LENS BARREL

(75) Inventor: Kazunori Takahashi, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 306 days.

(21) Appl. No.: 13/160,778

(22) Filed: Jun. 15, 2011

(65) Prior Publication Data

US 2012/0002306 A1    Jan. 5, 2012

(30) Foreign Application Priority Data

Jun. 30, 2010    (JP) ................................. 2010-148963

(51) Int. Cl.
*G02B 7/02* (2006.01)

(52) U.S. Cl.
USPC .......................................... 359/819; 359/830

(58) Field of Classification Search
USPC ................................................ 359/819, 830
See application file for complete search history.

(56) References Cited

U.S. PATENT DOCUMENTS 6,154,255 A * 11/2000 Shishido et al. .............. 348/375

FOREIGN PATENT DOCUMENTS

| JP | 10-115757 | 5/1998 |
| JP | 10-123603 | 5/1998 |

* cited by examiner

*Primary Examiner* — James Jones
(74) *Attorney, Agent, or Firm* — Greenblum & Bernstein, P.L.C.

(57) ABSTRACT

A screw-mount lens barrel includes a screw mount cylinder which is screw-engaged with a screw mount of a camera body, a shift ring which is rotatably supported by the screw mount cylinder to be coaxial therewith, a lens barrel body which supports an optical system and is adjustable relative to the shift ring in a direction orthogonal to an optical axis, and a shift adjustment mechanism for adjusting a position of the lens barrel body relative to the shift ring in directions orthogonal to the optical axis.

18 Claims, 5 Drawing Sheets

Fig.1

FRONT ←—————→ REAR

Fig.6

SCREW-MOUNT LENS BARREL

BACKGROUND OF THE INVENTION

1. Field of the Invention

The present invention relates to a screw-mount lens barrel that is detachably mounted onto a camera body via a screw mount.

2. Description of the Related Art

Screw-mount lens barrels are used in CCTV cameras such as surveillance cameras. In screw-mount lens barrels, a shift adjustment for aligning the optical axis of the lens barrel with an optical axis of a camera body (CCD), and a lens-to-body thread alignment adjustment for adjusting the rotational position (angular position) of the lens barrel relative to the camera body, are required. The lens-to-body thread alignment adjustment is for positioning, e.g., an index mark on the lens barrel or a lens-side cable extending there from to a specific angular position with respect to the camera body, since the relative rotational position (relative angular position) between the lens-side screw mount (the screw mount on the lens barrel) and the body-side screw mount (the screw mount on the camera body) is indefinite (unreliable).

Japanese Unexamined Patent Publication No. H10-115757 discloses a screw-mount lens barrel in which a shift adjustment and a lens-to-body thread alignment adjustment is possible. A lens-side mount frame that is screw-engaged with the body-side mount of a camera body is provided with a C-shaped rotation restricting groove, a lens holder frame that holds a photographing lens (photographing optical system) is provided with rotation restricting screws, and the lens-to-body thread alignment adjustment is carried out by rotating the lens holder frame relative to the lens-side mount frame with the rotation restricting screws engaged in the rotation restricting groove. In addition, the shift adjustment is carried out by moving a combination of the lens holder frame and a mount set ring relative to the lens-side mount frame in directions orthogonal to the optical axis by fixing the mount set ring to the lens holder frame in a relatively irrotatable manner and making a plurality of shift screws, which radially extend through (i.e., are screwed through) the mount set ring, contact and press against the lens-side mount frame.

However, in the above-described configuration (Japanese Unexamined Patent Publication No. H10-115757), since it is required to make the plurality of shift screws, which radially extend through the mount set ring, contact and press the lens-side mount frame while rotating the lens holder frame relative to the lens-side mount frame (since the shift adjustment and the lens-to-body thread alignment adjustment must be carried out simultaneously), these two adjustments are not very independent from each other, which complicates the operations for these adjustments, so that considerable experience is required to carry out the shift adjustment and the lens-to-body thread alignment adjustment. In addition, when only the shift adjustment or only the lens-to-body thread alignment adjustment is desired to be carried out independently, one cannot typically carry out either adjustment to a satisfactory extent.

SUMMARY OF THE INVENTION

The present invention provides a screw-mount lens barrel which enables the shift adjustment and the lens-to-body thread alignment adjustment to be carried out independently of each other.

The present invention has been devised based on the precondition that the central axis of the lens-side screw mount precisely aligns with the center of the light receiving surface of the camera body (i.e., a CCD image sensor) when the lens-side screw mount is screw-engaged onto the body-side screw mount of the camera body, and attention has been drawn to the fact that the shift adjustment and the lens-to-body thread alignment adjustment for a screw-mount lens barrel can be made independent of each other if an annular member is rotatably supported by the lens-side screw mount to be coaxial therewith (this annular member is hereinafter referred to as a shift ring) and also if a shift adjusting mechanism for adjusting the relative position between a lens-barrel body of the screw-mount lens barrel which supports an lens system and the shift ring (i.e., the lens-side screw mount) in directions orthogonal to the optical axis of the photographing optical system is installed between the lens barrel body and the shift ring, since the lens-to-body thread alignment adjustment can be carried out by rotating the shift-adjusted lens-barrel body together with the shift ring, relative to the body-side screw mount.

According to an aspect of the present invention, a screw-mount lens barrel is provided, including a screw mount cylinder which is screw-engaged with a screw mount of a camera body, a shift ring which is rotatably supported by the screw mount cylinder to be coaxial therewith, a lens barrel body which supports an optical system and is adjustable relative to the shift ring in a direction orthogonal to an optical axis, and a shift adjustment mechanism for adjusting a position of the lens barrel body relative to the shift ring in directions orthogonal to the optical axis.

It is desirable for the lens barrel body to include a sleeve which is positioned concentrically with the lens barrel body and defines a shift adjustment space between a radially inner side of the shift ring and the sleeve, and for the shift adjustment mechanism to move the shift ring and the sleeve relative to each other in the shift space in the direction orthogonal to the optical axis.

More specifically, the shift adjustment mechanism can be configured such that the shift adjustment mechanism includes at least three shift adjustment screws which are screwed in the shift ring and arranged at intervals in a circumferential direction, wherein end surfaces of the shift adjustment screws are in contact with the sleeve.

If the shift adjustment screws include four shift adjustment screws arranged at intervals of 90 degrees in the circumferential direction, the shift adjustment can be optimally carried out.

In addition, if the sleeve includes a circumferential groove with which end pressure surfaces of the shift adjustment screws that are screwed in the shift ring are in contact, the shift adjustment screws (the shift ring) can be prevented from coming off the sleeve even if the shift adjustment screws are loose before the shift adjustment is carried out.

If the screw-mount lens barrel includes a mount fixing ring which prevents the lens barrel body and the screw mount cylinder from rotating relative to each other, the lens-to-body thread alignment adjustment can be completed by tightening the screw mount cylinder by adjusting the relative rotational position between the lens barrel body and the camera body by rotating the lens barrel body (the shift ring) and the screw mount cylinder relative to each other. More specifically, the lens barrel body and the screw mount cylinder can be prevented from rotating relative to each other if the mount fixing ring prevents the lens barrel body and the screw mount cylinder from rotating relative to each other by tightening the lens barrel body and the screw mount cylinder relative to each other with the sleeve and the shift ring being held between the lens barrel body and the screw mount cylinder, with respect to the optical axis direction.

It is possible for the mount fixing ring to tighten the lens barrel body and the screw mount cylinder relative to each other with an adjustment member which has a predetermined thickness also being held between the lens barrel body and the screw mount cylinder, with respect to the optical axis direction. The adjustment member can be fixed together with the sleeve to the lens barrel body while being held between the lens barrel body and the sleeve. This structure makes it easy to adjust the distance between the lens barrel body and an image plane on the camera body side.

It is desirable for the shift adjustment space to be a ring-shaped space formed around the sleeve.

It is desirable for the mount fixing ring to be fitted onto the screw mount cylinder and screwed onto the lens barrel body.

In an embodiment, a screw-mount lens barrel is provided, including a lens barrel body which holds a photographing optical system therein, a screw mount cylinder which is mounted onto an end of the lens barrel body with respect to an optical axis direction of the photographing optical system and screw-engaged with a screw mount of a camera body when the screw-mount lens barrel is attached to the camera body, a shift ring positioned between the lens barrel body and the screw mount cylinder and rotatably supported by the screw mount cylinder and is coaxial therewith, and a shift adjustment mechanism for adjusting a position of the lens barrel body relative to the shift ring in directions orthogonal to the optical axis.

According to the present invention, a screw-mount lens barrel is achieved which enables the shift adjustment and the lens-to-body thread alignment adjustment to be carried out independently of each other.

The present disclosure relates to subject matter contained in Japanese Patent Application No. 2010-148963 (filed on Jun. 30, 2010) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENT

An embodiment of a screw-mount lens barrel 1 according to the present invention will be hereinafter discussed with reference to FIGS. 1 through 6. Forward and rearward directions in the following descriptions denote the directions of the arrows shown in FIGS. 1 through 4.

Figure 1:
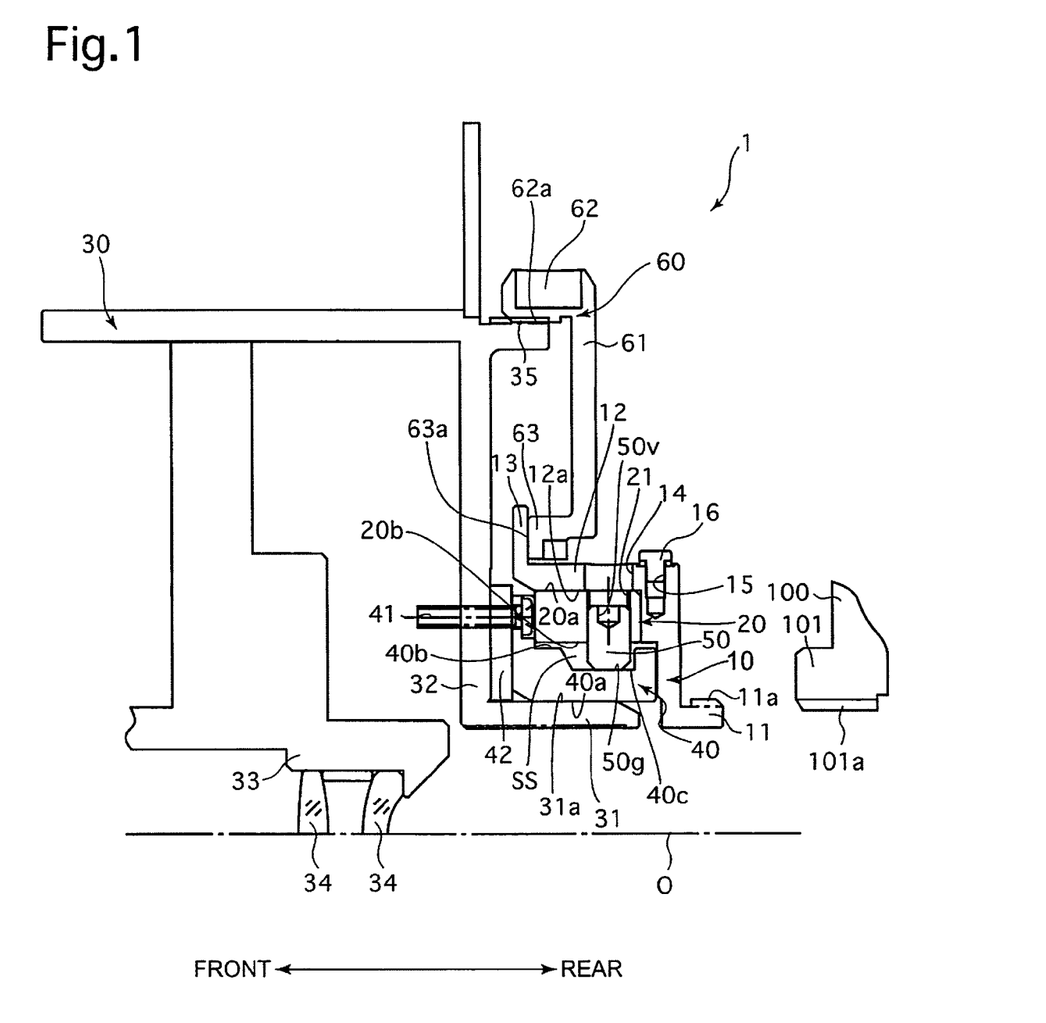
FIG. 1 is a longitudinal sectional view of a main part of an embodiment of a screw-mount lens barrel according to the present invention, showing only an upper half of the main part of the screw-mount lens barrel.
Figure 2:
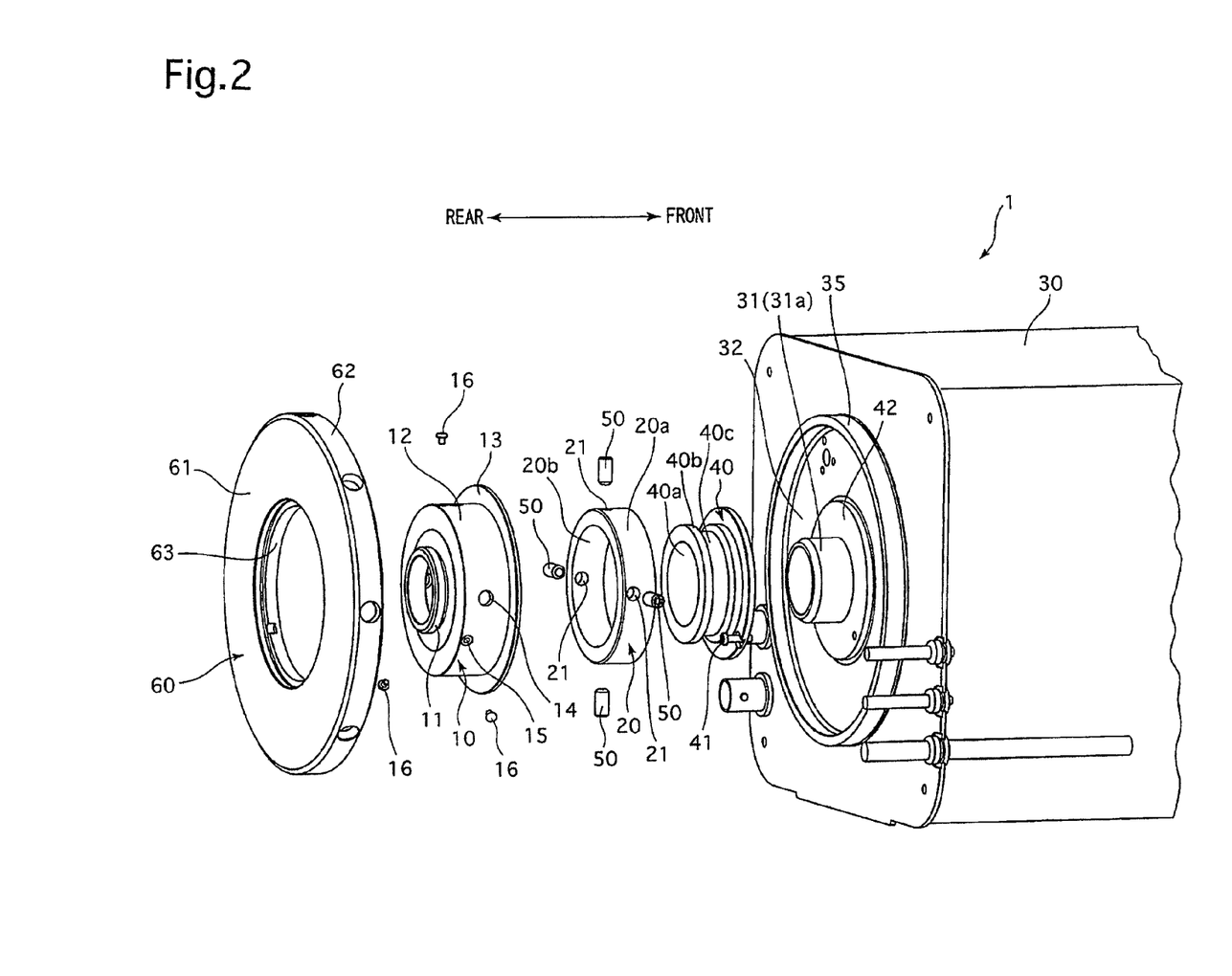
FIG. 2 is an exploded perspective view of part of the screw-mount lens barrel, viewed obliquely from the rear thereof.
Figure 3:
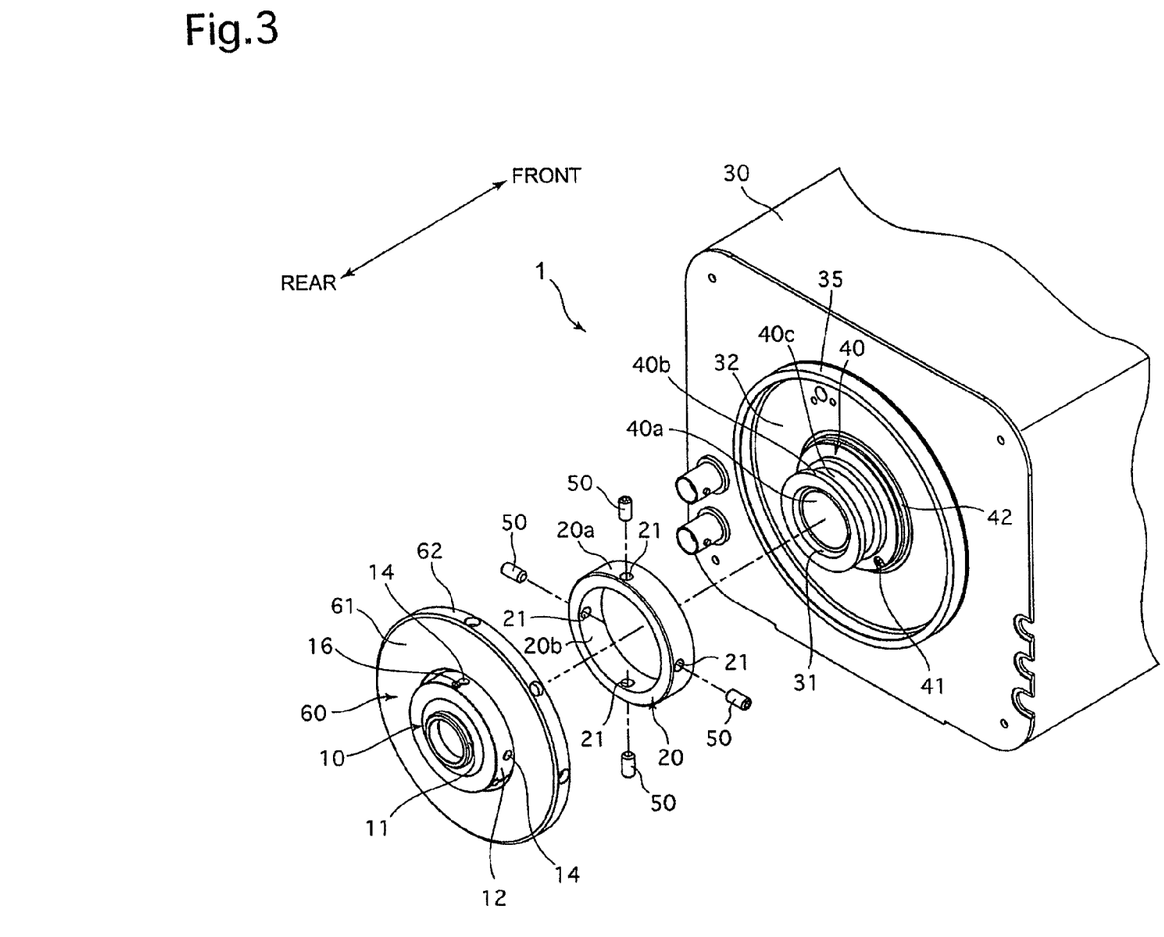
FIG. 3 is an exploded perspective view of the rear part of the screw-mount lens barrel, showing a state where a sleeve is fixed to a lens barrel body and a screw mount cylinder is installed to a mount fixing ring.
Figure 4:
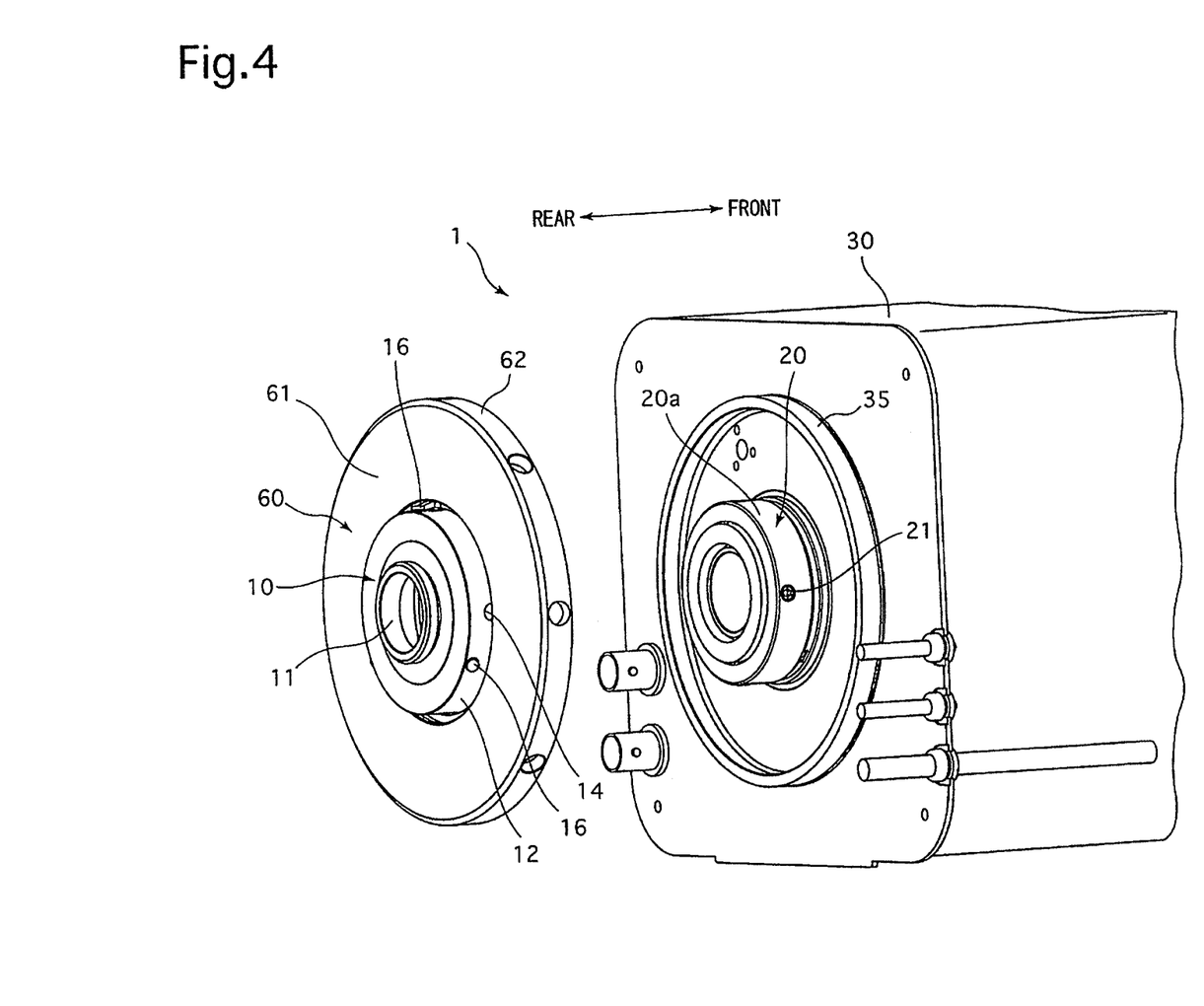
FIG. 4 is an exploded perspective view of the rear part of the screw-mount lens barrel.
Figure 5:
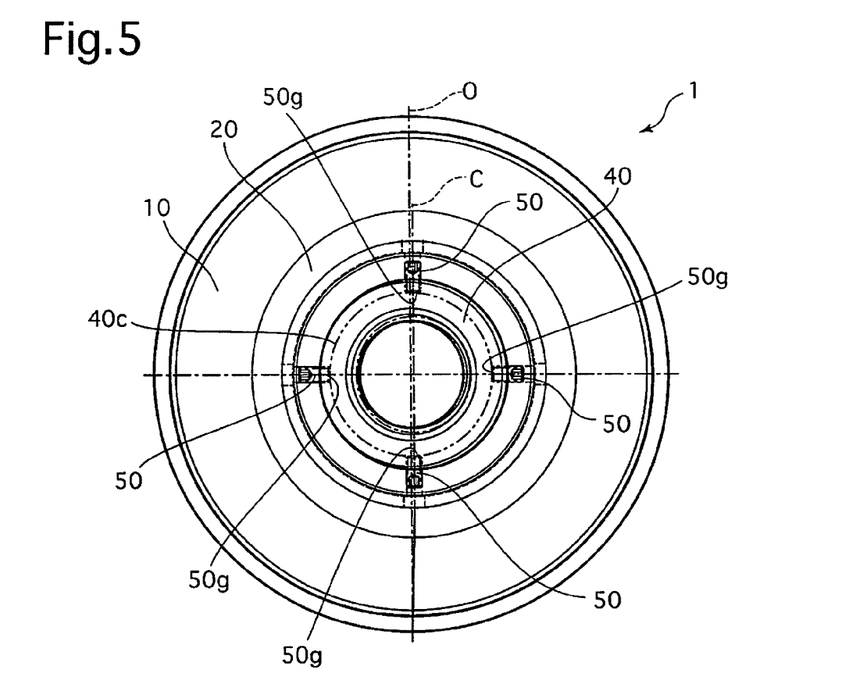
FIG. 5 is a view showing the screw-mount lens barrel before a shift adjustment is completed.
Figure 6:
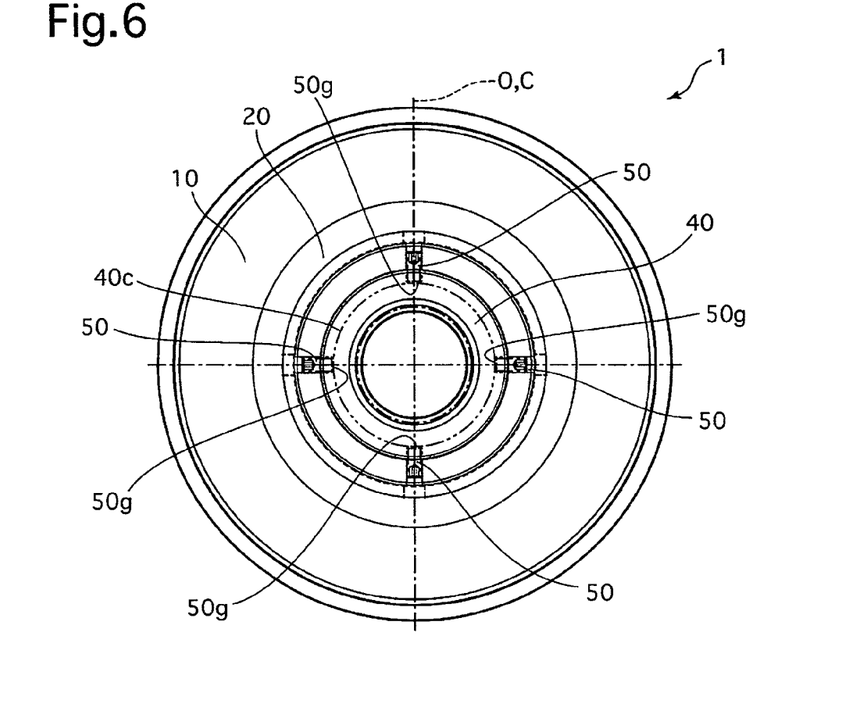
FIG. 6 is a view showing the screw-mount lens barrel after the shift adjustment is completed.

The screw-mount lens barrel 1 is provided with a lens-side screw mount cylinder 10 which is screw-engaged with a body-side screw mount 101 of a camera body 100 (see FIG. 1). The lens-side screw mount cylinder 10 is provided with a mount screw portion 11 and a cylindrical portion 12 which has a larger diameter than that of the mount screw portion 11, the central axes of which are aligned (coaxial) with the central axis of the lens-side screw mount cylinder 10, and a flange 13 which extends radially outwards from the cylindrical portion 12 in directions orthogonal to the optical axis O. A male thread 11a which is formed on the mount screw portion 11 is disengageably screw-engaged with a female thread 101a which is formed on the body-side mount 101. The position of the body-side mount 101 of the camera body 100 is predetermined so that the central axis of the body-side mount 101 precisely aligns with a center C (see FIGS. 5 and 6) of the light receiving surface (hereinafter referred to as the light receiving surface center C) of a CCD image sensor (not shown) held inside the camera body 100. Accordingly, when the male thread 11a of the mount screw portion 11 is screw-engaged with the female thread 101a of the body-side mount 101, the axis of the screw mount cylinder 10 (and hence the central axes of the mount screw portion 11 and the cylindrical portion 12) precisely aligns with the light receiving surface center C of the CCD image sensor.

The screw-mount lens barrel 1 is provided with a shift ring 20 which is fitted into the cylindrical portion 12 of the screw mount cylinder 10 to be rotatable relative to and coaxial with the screw mount cylinder 10 with an outer peripheral surface 20a of the shift ring 20 being in slidable contact with an inner peripheral surface 12a of the cylindrical portion 12. Namely, the diameters of the inner peripheral surface 12a of the cylindrical portion 12 and the outer peripheral surface 20a of the shift ring 20 are determined to allow the cylindrical portion 12 and the shift ring 20 to rotate relative to each other with a minimum clearance therebetween, and the screw mount cylinder 10 and the shift ring 20 are positioned coaxially with each other when the outer peripheral surface 20a of the shift ring 20 is brought into engagement with the inner peripheral surface 12a of the cylindrical portion 12.

The screw-mount lens barrel 1 is provided with a box-shaped lens barrel body 30 in front of the screw mount cylinder 10. The screw-mount lens barrel 1 is provided, inside the lens barrel body 30, with various known elements such as optical elements (optical system/lens system) 34 (see FIG. 1) that are supported by a retaining ring 33, a zoom mechanism (not shown), a focusing mechanism and an auto iris mechanism. The lens barrel body 30 is provided with a cylindrical projecting portion 31 which projects toward the screw mount cylinder 10 in a direction parallel to the optical axis O, and an orthogonal wall 32 which extends orthogonally to the optical axis O. A cylindrical sleeve 40 that is positioned on the outer periphery of the cylindrical projecting portion 31 is fixed to a rear surface (right-side surface with respect to FIG. 1) of the orthogonal wall 32 that faces the screw mount cylinder 10 by a set screw 41. An adjustment washer (adjustment member) 42 is provided between the front end face of the sleeve 40 and the orthogonal wall 32. The diameters of an outer peripheral surface 31a of the cylindrical projecting portion 31 and an inner peripheral surface 40a of the sleeve 40 are determined so that the cylindrical projecting portion 31 and the sleeve 40 can rotate relative to each other with a minimum clearance therebetween and so that the lens barrel body 30 (the optical axis O of the lens system that includes the optical elements 34) and the sleeve 40 are coaxially positioned.

As shown in FIG. 1, the screw-mount lens barrel 1 is provided with a ring-shaped shift space (shift adjustment space/clearance for adjustment) SS between an inner peripheral surface 20b of the shift ring 20 and an outer peripheral surface 40b of the sleeve 40. The shift ring 20 (the screw mount cylinder 10) can be moved relative to the sleeve 40 (i.e., relative to the lens barrel body 30) in this ring-shaped shift space SS in directions orthogonal to the optical axis O. The radial width of the shift space SS is set at, e.g., approximately 0.5 mm.

The screw mount cylinder 10 is provided, in the cylindrical portion 12 thereof at intervals of 90 degrees in the circumferential direction, with four radial through holes 14. The shift ring 20 is provided with four screw through holes 21 at intervals of 90 degrees corresponding to the four radial through holes 14 of the cylindrical portion 12. Four shift adjustment screws (shift adjustment mechanism) 50 are screwed into the four screw through holes 21, respectively, so that end pressure surfaces 50g of the four shift adjustment screws 50 enter an annular recessed portion (circumferential groove) 40c which is recessed radially inwards on the outer peripheral surface 40b of the sleeve 40. As shown in FIG. 1, each shift adjustment screw 50 is provided in the head thereof with a hexagonal slot (adjusting-operation slot) 50v, and the amount of projection of each shift adjustment screw 50 from the associated screw through hole 21 can be adjusted by adjusting the amount of screw-engagement of the shift adjustment screw 50 with the associated screw through hole 21 by rotating the shift adjustment screw 50 with a tool such as an Allen key (hexagon wrench) or a hexagonal-head screw driver with the hexagonal head thereof engaged in the hexagonal slot 50v. In the present embodiment, the sleeve 40 (the lens barrel body 30) is supported by the shift ring 20 via the four shift adjustment screws 50 with the end pressure surfaces 50g in contact with the bottom of the annular recessed portion 40c.

Therefore, the shift ring 20 (the screw mount cylinder 10) and the sleeve 40 (the lens barrel body 30) can be moved relative to each other in directions orthogonal to the optical axis O in the ring-shaped shift space SS by adjusting (varying) the amount of screw-engagement of each shift adjustment screw 50 with the associated screw through hole 21 using a tool such as an Allen key (hexagon wrench) or a hexagonal-head screw driver inserted through the associated radial through hole 14 in a state where the inner peripheral surface 12a of the cylindrical portion 12 of the screw mount cylinder 10 is engaged with the outer peripheral surface 20a of the shift ring 20 (i.e., the screw mount cylinder 10 is fitted into the shift ring 20) and with the circumferential positions of the four radial through holes 14 and the circumferential positions of the four screw through holes 21 mutually coinciding (i.e., the four radial through holes 14 and the four screw through holes 21 are radially aligned).

The screw-mount lens barrel 1 is provided with amount fixing ring 60 which is fitted on the outer periphery of the screw mount cylinder 10. The mount fixing ring 60 is for fixing the screw mount cylinder 10 and the lens barrel body 30 to each other after making an adjustment to the relative rotational position (angular position) between the lens barrel body 30 and the lens mount cylinder 10. The mount fixing ring 60 is provided with an orthogonal flange (a flange perpendicular to the optical axis) 61 extending in directions orthogonal to the optical axis O, and is further provided at radially outer and inner edges of the orthogonal flange 61, with an outer cylindrical portion 62 and an inner peripheral portion 63, respectively, which are formed concentrically with each other. A female thread 62a, which is screw-engaged with a male thread 35 formed on the lens barrel body 30, is formed on an inner peripheral surface of the outer cylindrical portion 62, and a contact surface 63a which comes in pressing contact with the flange 13, and is disengageable from the flange 13, is formed on the front of the inner peripheral portion 63. FIG. 1 shows a state where the contact surface 63a is in contact with the flange 13.

The mount fixing ring 60 is freely movable in the axial direction thereof relative to the cylindrical portion 12 of the screw mount cylinder 10 in a state before the female thread 62a is screw-engaged with the male thread 35 of the lens barrel body 30. Tightening the female thread 62a of the mount fixing ring 60 against the male thread 35 causes the contact surface 63a of the inner peripheral portion 63 to be pressed firmly against the flange 13 of the screw mount cylinder 10, thus preventing the screw mount cylinder 10 and the lens barrel body 30 from rotating relative to each other.

The cylindrical portion 12 is provided, on an outer peripheral surface thereof at intervals of 120 degrees in the circumferential direction, with three female screw holes 15. The mount fixing ring 60 is prevented from coming off the cylindrical portion 12 by three retaining screws (mount-fixing-ring remaining screws) 16 which are screw-engaged in the three female screw holes 15, respectively, with the mount fixing ring 60 being fitted on the cylindrical portion 12.

The screw-mount lens barrel 1 that has the above-described structure (configuration) is produced and installed as follows.
(Production at Factory)

When the screw-mount lens barrel 1 is produced, firstly the sleeve 40 is fitted onto the cylindrical projecting portion 31 of the lens barrel body 30 and fixed thereto by the set screw 41 with the adjustment washer 42 being positioned between a front end surface of the sleeve 40 and the orthogonal wall 32 of the lens barrel body 30. In this state, the concentricity between the lens barrel 30 and the sleeve 40 is ensured by the engagement between the outer peripheral surface 31a of the cylindrical projecting portion 31 and the inner peripheral surface 40a of the sleeve 40.

On the other hand, in addition to the fitting of the sleeve 40 onto the cylindrical projecting portion 31, the shift ring 20 is fitted into the cylindrical portion 12 of the screw mount cylinder 10. Thereupon, due to the engagement between the inner peripheral surface 12a of the cylindrical portion 12 and the outer peripheral surface 20a of the shift ring 20, concentricity between the shift ring 20 and the cylindrical portion 12 is ensured. At this stage, the four shift adjustment screws 50 are screwed into the four screw through holes 21 of the shift ring 20 through the four radial through holes 14 of the screw mount cylinder 10, respectively, to a degree (at a temporary position) such that the end pressure surface 50g of each shift adjustment screw 50 is positioned radially outside of the outer peripheral surface 40b of the sleeve 40.

Subsequently, the temporary combination of the screw mount cylinder 10 and the shift ring 20 is fitted on the outer periphery of the sleeve 40. In this engaged state, the ring-shaped shift space SS in directions orthogonal to the optical axis O exists between the inner peripheral surface 20b of the shift ring 20 and the outer peripheral surface 40b of the sleeve 40. In this state, screwing the four shift adjustment screws 50 in the four screw through holes 21 until the end pressure surfaces 50g enter the annular recessed portion 40c, respectively, prevents the temporary combination of the screw mount cylinder 10 and the shift ring 20 from coming off the cylindrical projecting portion 31 of the lens barrel body 30.

Subsequently, if the amount of engagement of each shift adjustment screw 50 with the associated screw through hole 21 is adjusted with the end pressure surfaces 50g in contact with the bottom of the annular recessed portion 40c, the amount of eccentricity of the sleeve 40 (and hence, the lens barrel body 30) from the shift ring 20 (and hence, the screw mount cylinder 10) can be adjusted. Since the axis of the screw mount cylinder 10 precisely aligns with the light receiving surface center C of the CCD image sensor (not shown) that is supported inside the camera body 100, the above described eccentricity adjustment makes it possible to carry out a shift adjustment for bringing the optical axis O (lens-barrel optical axis) in alignment with the center C of the light receiving surface of the CCD image sensor. Namely, a shift adjustment for moving the screw-mount lens barrel 1 from a state (e.g., the state shown in FIG. 5) where the optical axis O (lens-barrel optical axis) and the light receiving surface center C deviate from each other to a state (shown in FIG. 6) where the optical axis O (lens-barrel optical axis) and the light receiving surface center C precisely align with each other can be carried out.

In addition to the above described shift adjustment, the screw mount cylinder 10 and the mount fixing ring 60 are temporarily put together by screwing the three retaining screws 16 in the three female screw holes 15, respectively, with the mount fixing ring 60 being fitted on the cylindrical portion 12 of the screw mount cylinder 10. This temporary assembling operation can be performed at any stage.

(Installation at Installation Site)

For instance, when the screw-mount lens barrel 1 is installed as a photographing lens of a surveillance camera at an installation site, firstly the mount screw portion 11 of the screw mount cylinder 10 is screwed into the body-side screw mount 101 of the camera body 100 to be fixed thereto. Thereupon, because of the nature of the screw mount, the top/bottom of the lens barrel, which are determined by, e.g., an index mark (not shown) provided on either the lens barrel body 30 or a lens-side cable (not shown) extending from the lens barrel body 30, are not positioned at a specific angle relative to the camera body 100. For this reason, in this state the shift ring 20 and the lens barrel body 30, which are movable, are made to rotate relative to the screw mount cylinder 10, which is fixed.

Subsequently, after a lens-to-body thread alignment adjustment in which the above-mentioned index mark provided on either the lens barrel body 30 or a lens-side cable extending from the lens barrel body 30 is brought to the above-mentioned specific angular position relative to the camera body 100 is completed, the female thread 62a of the mount fixing ring 60 and the male thread 35 of the lens barrel body 30 are fully tightened to make the contact surface 63a of the inner peripheral portion 63 come into intimate contact with (press against) the flange 13 (which is fixed) of the screw mount cylinder 10. In this state, the lens barrel body 30, to which the lens-to-body thread alignment adjustment has been completed, is prevented from rotating relative to the lens mount cylinder 10 (the camera body 100). With the above described operations, the lens-to-body thread alignment adjustment that is for adjusting the rotational position (angular position) of the lens barrel body 30 relative to the camera body 100 is completed at the installing stage at an installation site.

As described above, the screw-mount lens barrel 1 according to the present invention is provided with the lens-side screw mount cylinder 10 that is screw-engaged with the body-side screw mount 101 of the camera body 100, the shift ring 20 that is rotatably supported by the screw mount cylinder 10 to be coaxial therewith, the lens barrel body 30 that supports the optical elements 34 of the photographing optical system and is adjustable relative to the shift ring 20 in directions orthogonal to the optical axis O, and the four shift adjustment screws (shift adjustment mechanism) 50 for adjusting the position of the lens barrel body 30 relative to the shift ring 20 in directions orthogonal to the optical axis O. With this configuration, the shift adjustment and the lens-to-body thread alignment adjustment can be made independent of each other since the shift adjustment can be completed by operating the shift adjustment screws (shift adjustment mechanism) 50 at the production stage at a factory, and the lens-to-body thread alignment adjustment can be carried out on-site by rotating the lens barrel body 30, to which the lens-to-body thread alignment adjustment has been completed, together with the shift ring 20 relative to the screw mount cylinder 10. Accordingly, unlike the case of the related art, according to the present embodiment of the screw-mount lens barrel, neither of the shift adjustment nor the lens-to-body thread alignment adjustment exerts an influence upon the other, which makes it possible to easily carry out the shift adjustment and the lens-to-body thread alignment adjustment without need of any significant experience.

Although the four shift adjustment screws 50 are arranged at intervals of 90 degrees in the circumferential direction of the shift ring 20 in the above described embodiment of the screw-mount lens barrel, the number of the shift adjustment screws 50 is not limited to four; at least three shift adjustment screws 50 have only to be arranged in the circumferential direction of the shift ring 20. Although the shift ring 20 is supported with the end pressure surfaces 50g of the shift adjustment screws 50 in contact with the outer peripheral surface 40b of the sleeve 40 (for performing the shift adjustment) in the above described embodiment of the screw-mount lens barrel, it is possible to adopt a different configuration in which the end pressure surfaces 50g of the shift adjustment screws 50 are brought in direct contact with the outer peripheral surface 31a (or an annular recessed portion (circumferential groove) formed on the outer peripheral surface 31a) of the cylindrical projecting portion 31 of the lens barrel body 30 with an omission of the sleeve 40.

Although the adjustment washer 42 is interposed between the front end face of the sleeve 40 and the orthogonal wall 32 in the above described embodiment of the screw-mount lens barrel, it is possible to adopt a different configuration in which the front end face of the sleeve 40 is brought into direct contact with the orthogonal surface 32 of the lens barrel body 30 with the adjustment washer 42 omitted.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A screw-mount lens barrel comprising:
    a screw mount cylinder which is screw-engaged with a screw mount of a camera body;
    a shift ring which is rotatably supported by said screw mount cylinder while being maintained in a coaxial rotational relation with respect to the screw mount cylinder, the screw mount cylinder mounted concentrically about the shift ring;
    a lens barrel body which supports an optical system and is adjustable relative to said shift ring in a direction orthogonal to an optical axis; and
    a shift adjustment mechanism that adjusts a position of said lens barrel body relative to said shift ring in directions orthogonal to said optical axis.

2. The screw-mount lens barrel according to claim 1, wherein said lens barrel body comprises a sleeve which is positioned concentrically with said lens barrel body and defines a shift adjustment space between a radially inner side of said shift ring and said sleeve, and wherein said shift adjustment mechanism moves said shift ring and said sleeve relative to each other in said shift space in said direction orthogonal to said optical axis.

3. The screw-mount lens barrel according to claim 2, wherein said shift adjustment mechanism comprises at least three shift adjustment screws which are screwed in said shift ring and arranged at intervals in a circumferential direction, wherein end surfaces of said shift adjustment screws are in contact with said sleeve.

4. The screw-mount lens barrel according to claim 3, wherein said shift adjustment screws comprise four shift adjustment screws arranged at intervals of 90 degrees in said circumferential direction.

5. The screw-mount lens barrel according to claim 3, wherein said sleeve comprises a circumferential groove with which end pressure surfaces of said shift adjustment screws that are screwed in said shift ring are in contact.

6. The screw-mount lens barrel according to claim 2, further comprising a mount fixing ring which prevents said lens barrel body and said screw mount cylinder from rotating relative to each other.

7. The screw-mount lens barrel according to claim 6, wherein said mount fixing ring prevents said lens barrel body and said screw mount cylinder from rotating relative to each other by tightening said lens barrel body and said screw mount cylinder relative to each other with said sleeve and said shift ring being held between said lens barrel body and said screw mount cylinder, with respect to said optical axis direction.

8. The screw-mount lens barrel according to claim 7, wherein said mount fixing ring tightens said lens barrel body and said screw mount cylinder relative to each other with an adjustment member which has a predetermined thickness also being held between said lens barrel body and said screw mount cylinder, with respect to said optical axis direction.

9. The screw-mount lens barrel according to claim 8, wherein said adjustment member is fixed together with said sleeve to said lens barrel body while being held between said lens barrel body and said sleeve.

10. The screw-mount lens barrel according to claim 2, wherein said shift adjustment space is a ring-shaped space formed around said sleeve.

11. The screw-mount lens barrel according to claim 6, wherein said mount fixing ring is fitted onto said screw mount cylinder and screwed onto said lens barrel body.

12. A screw-mount lens barrel comprising:
a lens barrel body which holds a photographing optical system therein;
a screw mount cylinder which is mounted onto an end of said lens barrel body with respect to an optical axis direction of said photographing optical system and screw-engaged with a screw mount of a camera body when said screw-mount lens barrel is attached to the camera body;
a shift ring positioned between said lens barrel body and said screw mount cylinder and rotatably supported by said screw mount cylinder while being maintained in a coaxial rotating relation with respect to the screw mount cylinder, the screw mount cylinder mounted concentrically about the shift ring; and
a shift adjustment mechanism that adjusts a position of said lens barrel body relative to said shift ring in directions orthogonal to said optical axis.

13. The screw mount lens barrel according to claim 1, said lens barrel body is adjustable relative to said shift ring in the direction orthogonal to the optical axis while the coaxial relation between said screw mount member and said shift ring is maintained.

14. The screw mount lens barrel according to claim 12, said lens barrel body is adjustable relative to said shift ring in the direction orthogonal to the optical axis while the coaxial relation between said screw mount member and said shift ring is maintained.

15. The screw mount lens barrel according to claim 1, an inner periphery of the shift ring is sized so to provide coaxial sliding contact with an outer periphery of the screw mount cylinder.

16. The screw mount lens barrel according to claim 12, an inner periphery of the shift ring is sized so to provide coaxial sliding contact with an outer periphery of the screw mount cylinder.

17. The screw mount lens barrel according to claim 12, wherein said lens barrel body comprises a sleeve which is positioned concentrically with said lens barrel body and defines a shift adjustment space between a radially inner side of said shift ring and said sleeve, and wherein said shift adjustment mechanism moves said shift ring and said sleeve relative to each other in said shift space in the direction orthogonal to the optical axis.

18. The screw mount lens barrel according to claim 17, wherein said shift adjustment mechanism comprises a plurality of adjustment screws which are engaged with said shift ring at predetermined intervals in a circumferential direction, wherein end surfaces of said shift adjustment screws contract said sleeves.

* * * * *